(12) United States Patent
Kimura et al.

(10) Patent No.: US 10,817,073 B2
(45) Date of Patent: Oct. 27, 2020

(54) ELECTRONIC DEVICE

(71) Applicant: SHARP KABUSHIKI KAISHA, Sakai, Osaka (JP)

(72) Inventors: Tomohiro Kimura, Sakai (JP); Kohji Fujiwara, Sakai (JP); Hiroshi Fukushima, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/494,905

(22) PCT Filed: Mar. 16, 2018

(86) PCT No.: PCT/JP2018/010626
 § 371 (c)(1),
 (2) Date: Sep. 17, 2019

(87) PCT Pub. No.: WO2018/173978
 PCT Pub. Date: Sep. 27, 2018

(65) Prior Publication Data
 US 2020/0089327 A1 Mar. 19, 2020

(30) Foreign Application Priority Data
 Mar. 23, 2017 (JP) ................. 2017-057539

(51) Int. Cl.
 G06F 3/02 (2006.01)
 G06F 3/041 (2006.01)
 G06F 3/0484 (2013.01)
 G06F 1/16 (2006.01)

(52) U.S. Cl.
 CPC ............ G06F 3/0202 (2013.01); G06F 1/163 (2013.01); G06F 3/0418 (2013.01); G06F 3/04847 (2013.01)

(58) Field of Classification Search
 CPC .................................................... G06F 3/0202
 See application file for complete search history.

(56) References Cited

U.S. PATENT DOCUMENTS

| | | | |
|---|---|---|---|
| 2012/0099406 A1* | 4/2012 | Lau | G06F 1/163 368/69 |
| 2014/0139637 A1* | 5/2014 | Mistry | G06F 1/163 348/46 |
| 2015/0109744 A1 | 4/2015 | Jufer et al. | |
| 2015/0169101 A1* | 6/2015 | Jung | G06F 3/044 345/174 |
| 2017/0090239 A1* | 3/2017 | Jung | G06F 3/0412 |
| 2017/0329511 A1 | 11/2017 | Ueno et al. | |
| 2018/0217190 A1* | 8/2018 | Spevak | G01N 27/228 |

FOREIGN PATENT DOCUMENTS

| | | |
|---|---|---|
| JP | 2015-078984 A | 4/2015 |
| JP | 2016-115208 A | 6/2016 |

* cited by examiner

Primary Examiner — Matthew Yeung
(74) Attorney, Agent, or Firm — ScienBiziP, P.C.

(57) ABSTRACT

An electronic device capable of detecting a rotation amount of a dial without depending on a mechanism is achieved. A ring-like shape dial surrounds a peripheral edge of an electrostatic type touch panel, the dial includes a conductive pattern, which is formed of a conductive material, on an inner surface facing the touch panel.

13 Claims, 8 Drawing Sheets

DIAL SIGNAL

FIG. 2B  DIAL OPERATION

FIG. 2C  TOUCH OPERATION

ELECTRONIC DEVICE

TECHNICAL FIELD

The disclosure relates to an electronic device, particularly to an electronic device including a touch panel and a dial.

BACKGROUND ART

A touch device (electronic device) including a touch panel and a dial has been developed. As an example of such a device, PTL 1 describes a so-called wearable wrist-watch type device, which includes a dial arranged in a periphery of a circular-shape touch panel.

FIG. 8 is an exploded view illustrating an example of a configuration of a known touch device 9. As illustrated in FIG. 8, the touch device 9 includes a touch panel 910, a dial 920, a rotation amount detection unit 920A, and a display 930. The touch panel 910 is an electrostatic type touch panel. In a case where a finger of a user gets close to the touch panel 910, the touch panel 910 detects change of electrostatic capacitance. The touch panel 910 outputs a signal based on the change of the detected electrostatic capacitance. The dial 920 has a ring-like shape, and surrounds the periphery of the touch panel 910. The dial 920 is rotatable about an axis vertical to the surface of the touch panel 910. The rotation amount detection unit 920A detects a rotation amount of the dial 920, which is measured from a reference position.

CITATION LIST

Patent Literature

PTL 1: US 2014/0139637 A (published on May 22, 2014)

SUMMARY

Technical Problem

The rotation amount detection unit 920A of the touch device 9 illustrated in FIG. 8 is implemented by a mechanism such as a gear. Thus, the touch device 9 is required to have a space for installing the rotation amount detection unit 920A, and hence reduction in size is difficult. The touch device 9 is required to include a wiring line and a control device (not illustrated) that are dedicated for transmitting information on the rotation amount detected by the rotation amount detection unit 920A.

An aspect of the disclosure has an object to achieve an electronic device capable of detecting a rotation amount of a dial without depending on a mechanism.

Solution to Problem

In order to achieve the above-mentioned object, an electronic device according to an aspect of the disclosure includes a touch panel of an electrostatic type and a dial having a ring-like shape surrounding a peripheral edge of the touch panel. The dial includes a mark part on an inner surface facing the touch panel or a surface adjacent to the inner surface, the mark part being formed of a conductive material.

Advantageous Effects of Disclosure

According to an aspect of the disclosure, the rotation amount of the dial can be detected without depending on a mechanism.

BRIEF DESCRIPTION OF DRAWINGS

Each of FIGS. 2A to 2C is a diagram illustrating signals generated by a touch panel of the touch device according to the first embodiment: FIG. 2B illustrates signals in a case where the conductive pattern of the dial moves from the reference position by a dial operation; and FIG. 2C illustrates signals in a case where the touch device receives a touch operation.

Each of FIGS. 7A to 7E is a diagram illustrating a modified example of a conductive pattern applicable to the touch device according to the first or second embodiment.

Figure 8:
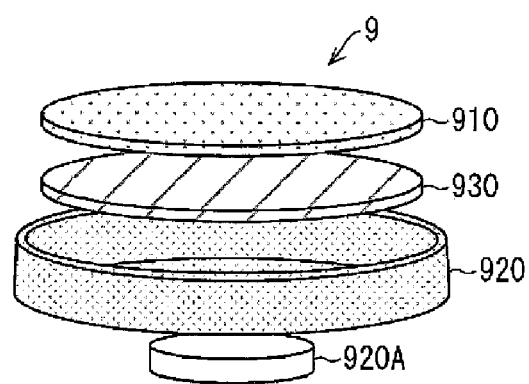

FIG. 8 is an exploded view illustrating a configuration of a known touch device.

DESCRIPTION OF EMBODIMENTS

First Embodiment

Now, with reference FIG. 1 to FIG. 5, a detailed description on embodiments of the disclosure is provided.

Configuration of Touch Device 1

Figure 1:
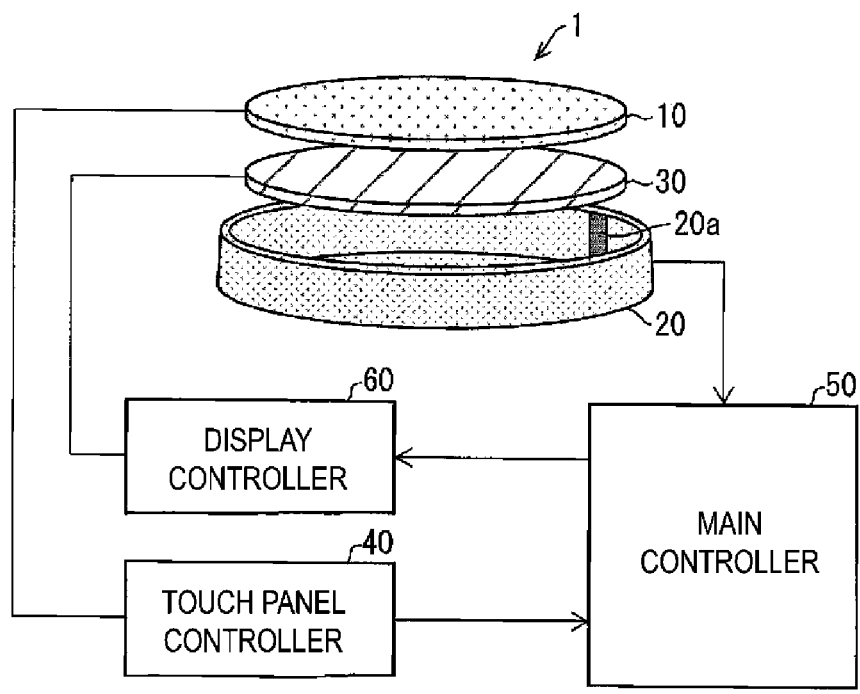
FIG. 1 is an exploded view illustrating a configuration of a touch device according to a first embodiment.

With reference to FIG. 1, a description of a touch device 1 (electronic device) according to a first embodiment is provided. FIG. 1 is an exploded view illustrating a configuration of the touch device 1 according to the first embodiment. As illustrated in FIG. 1, the touch device 1 includes a touch panel 10, a dial 20, a display 30, a touch panel controller 40, a main controller 50, and a display controller 60. Although not illustrated, a cover glass is arranged on the touch panel 10. An upper surface of the cover glass is a touch surface that a user touches in a case where a touch operation is performed.

The touch panel 10 is an electrostatic type touch panel for detecting a touch operation (see FIG. 2C). The touch panel 10 includes a plurality of electrostatic sensors. Those electrostatic sensors detect a change amount of electrostatic capacitance. The touch panel 10 outputs, to the touch panel controller 40, the change of the electrostatic capacitance detected by the plurality of electrostatic sensors as a signal.

The dial 20 is rotatable about an axis vertical to the surface of the touch panel 10. An operation of rotating the dial 20 is referred to as a dial operation (see FIG. 2B). The dial 20 has a ring-like shape, and surrounds the periphery of the touch panel 10. A conductive pattern 20a (mark part) for indicating a reference position of the dial 20 is provided to a part of an inner surface of the dial 20. Alternatively, the conductive pattern 20a may be provided to an upper part or a lower part of the dial 20. One or a plurality of conductive patterns 20a may be provided to the dial 20 (third embodiment). The conductive pattern 20a is formed of a conductive material such as aluminum or copper. In contrast, parts of the dial 20 other than the conductive pattern 20a are formed of a non-conductive material. Alternatively, the parts of the dial 20 other than the conductive pattern 20a may formed of a conductive material having lower conductivity than the conductive pattern 20a or a semiconductor material.

The display 30 is a display device controlled by the display controller 60. The display 30 may be, for example, a liquid crystal display device or an organic Electro luminescence (EL) display device. The display 30 and the display controller 60 are not necessary for the touch device 1. That is, the touch device 1 may not include the display 30 and the display controller 60.

The touch panel controller 40 acquires a signal output by the touch panel 10 in a case where the change of the electrostatic capacitance is detected. Then, the touch panel controller 40 specifies a rotation amount (dial position) of the dial 20, which is measured from the reference position, and a position (touch position) at which the touch operation is performed, based on the acquired signal. A method of specifying the dial position and the touch position from the signal, which is performed by the touch panel controller 40, is described later. The touch panel controller 40 transmits, to the main controller 50, information indicating the specified dial position and touch position.

The main controller 50 controls components of the touch device 1, based on the dial position information and the touch position information that are received from the touch panel controller 40. For example, the main controller 50 generates an instruction for changing a graphical interface displayed on the display 30, depending on the touch position and the dial position. In this case, the main controller 50 transmits the generated instruction to the display controller 60. The display controller 60 controls display on the display 30 in accordance with the instruction from the main controller 50.

Signal Generated by Touch Panel 10

Figure 2A:
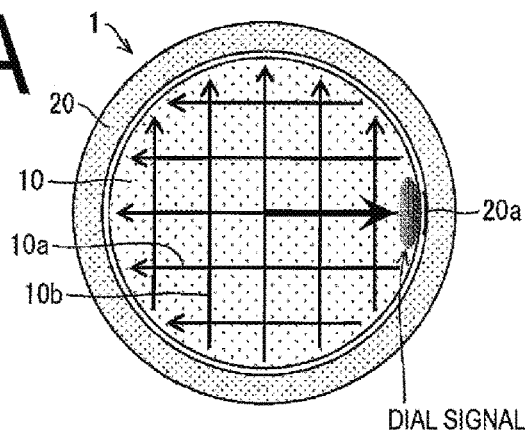
FIG. 2A illustrates signals in a case where a conductive pattern of a dial is at a reference position.
Figure 2A:
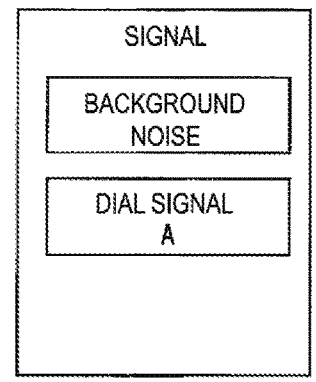
Figure 2A:
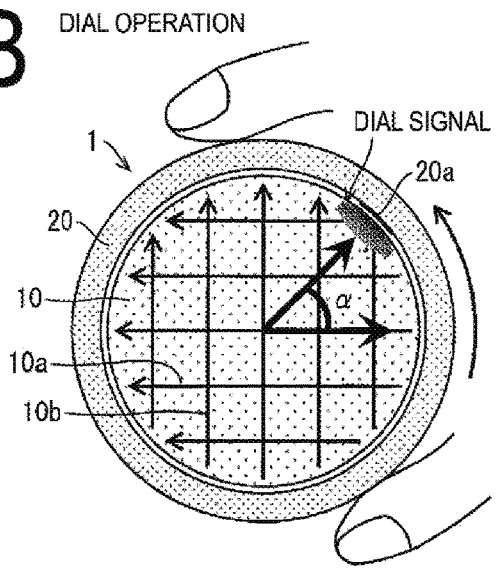
Figure 2A:
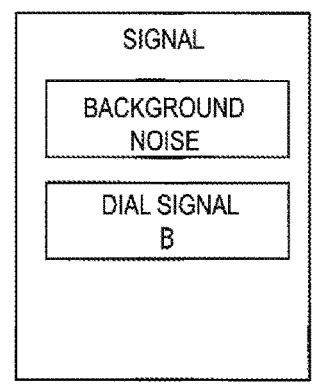
Figure 2A:
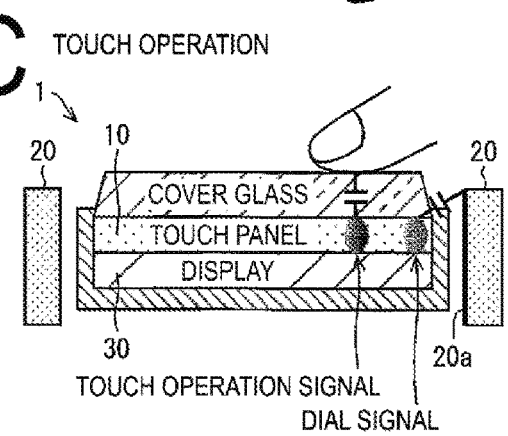
Figure 2A:
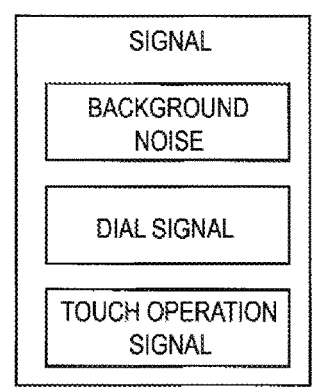

With reference to FIGS. 2A to 2C, a description of signals generated by the touch panel 10 is provided. Each of FIGS. 2A and 2B is a top view of the touch device 1. FIG. 2C is a cross-sectional view of the touch device 1.

As illustrated in FIGS. 2A and 2B, the touch panel 10 includes a plurality of sensor lines 10a and 10b provided vertically and horizontally over the entire upper surface of the touch panel 10. At each of the positions at which the sensor lines 10a and the sensor lines 10b intersect with each other, an electrostatic sensor is formed.

FIG. 2A illustrates signals generated by the touch panel 10 before a dial operation illustrated in FIG. 2B is performed. In this case, the signals output by the touch panel 10 include a dial signal A and background noise. Here, the dial signal is a signal generated by the touch panel 10, based on electrostatic capacitance between the conductive pattern 20a and the touch panel 10. The background noise is an unnecessary signal generated by the touch panel 10. The touch panel 10 outputs substantially constant background noise at all times regardless of presence or absence of the touch operation or a dial position.

FIG. 2B illustrates signals generated by the touch panel 10 after the dial 20 is rotated by a rotation amount a by a dial operation. In this case, the signals output by the touch panel 10 include a dial signal B and background noise. The conductive pattern 20a indicating the reference position of the dial 20 moves by the dial operation, and hence the dial signal B is generated at a position different from the dial signal A on the touch panel 10.

FIG. 2C illustrates signals generated by the touch panel 10 in a case where a touch operation is performed. In this case, the touch panel 10 generates a touch operation signal based on electrostatic capacitance between a finger of a user performing the touch operation and the touch panel 10. The signals generated by the touch panel 10 include a dial signal and background noise.

The touch operation signal and the dial signal have difference features. In general, the touch operation signal has a substantially circular shape in a plane of the touch panel 10, and has a maximum value at the center of the signal. In contrast, the dial signal is generated in the vicinity of the peripheral edge of the touch panel 10, and has small time change in a shape and a value of the signal.

Signal Value

Figure 3:
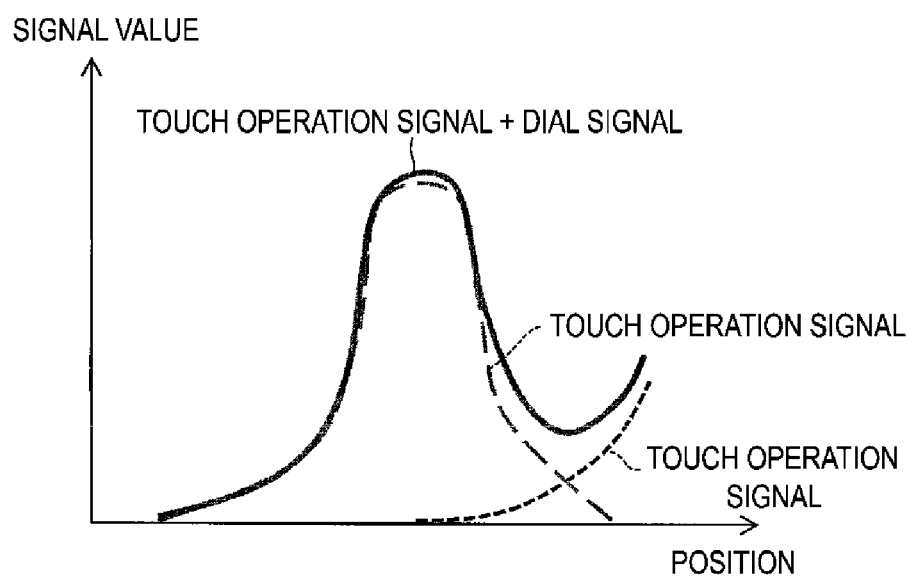
FIG. 3 is a graph illustrating values of signals generated by the touch panel in a case where the touch device according to the first embodiment receives a touch operation.

FIG. 3 is a graph illustrating a distribution of strengths of signals (signal values) generated by the touch panel 10 in a case where the touch operation is performed. The graph illustrated in FIG. 3 is obtained by taking the distribution of the signal values on the touch panel 10 along the line passing through the peak of the touch operation signal. The starting point of the horizontal arrow in FIG. 3 corresponds to the center of the touch panel 10. The orientation of the horizontal arrow in FIG. 3 corresponds to an orientation from the center to the peripheral edge of the touch panel 10. The signals generated by the touch panel 10 include a touch operation signal, a dial signal, and background noise (see FIG. 2C). However, in FIG. 3, illustration of the background noise is omitted.

In FIG. 3, the signals generated by the touch panel 10 are indicated with a solid line. Each of the touch operation signal and the dial signal included in the signals is indicated with a broken line. As illustrated FIG. 3, the signals generated by the touch panel 10 has a shape obtained by overlapping the touch operation signal and the dial signal. The peak position of the touch operation signal is closer to the center of the touch panel 10 than the peak position of the dial signal.

Operation of Touch Device 1

Figure 4:
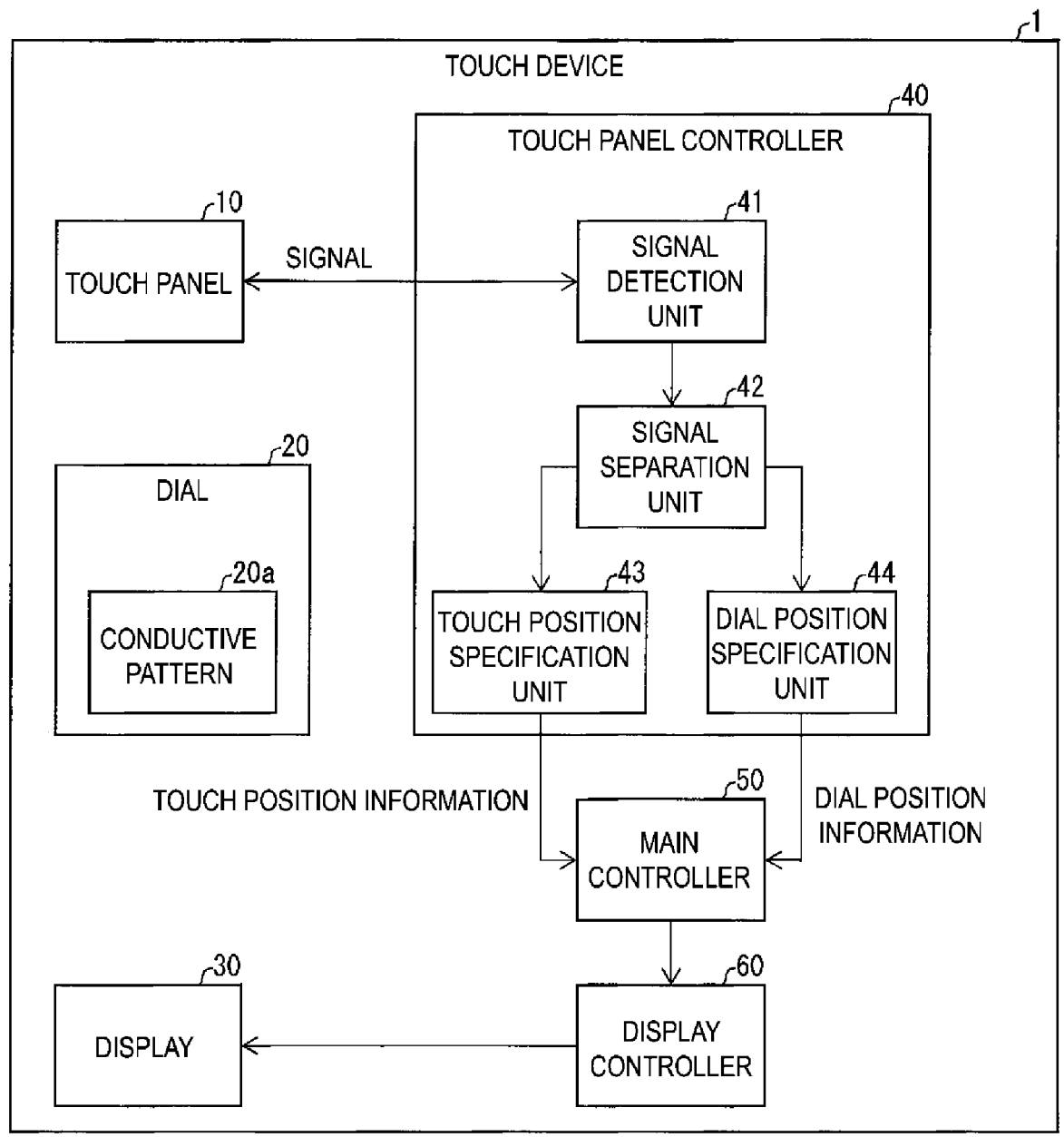
FIG. 4 is a block diagram illustrating the touch device according to the first embodiment.
Figure 5:
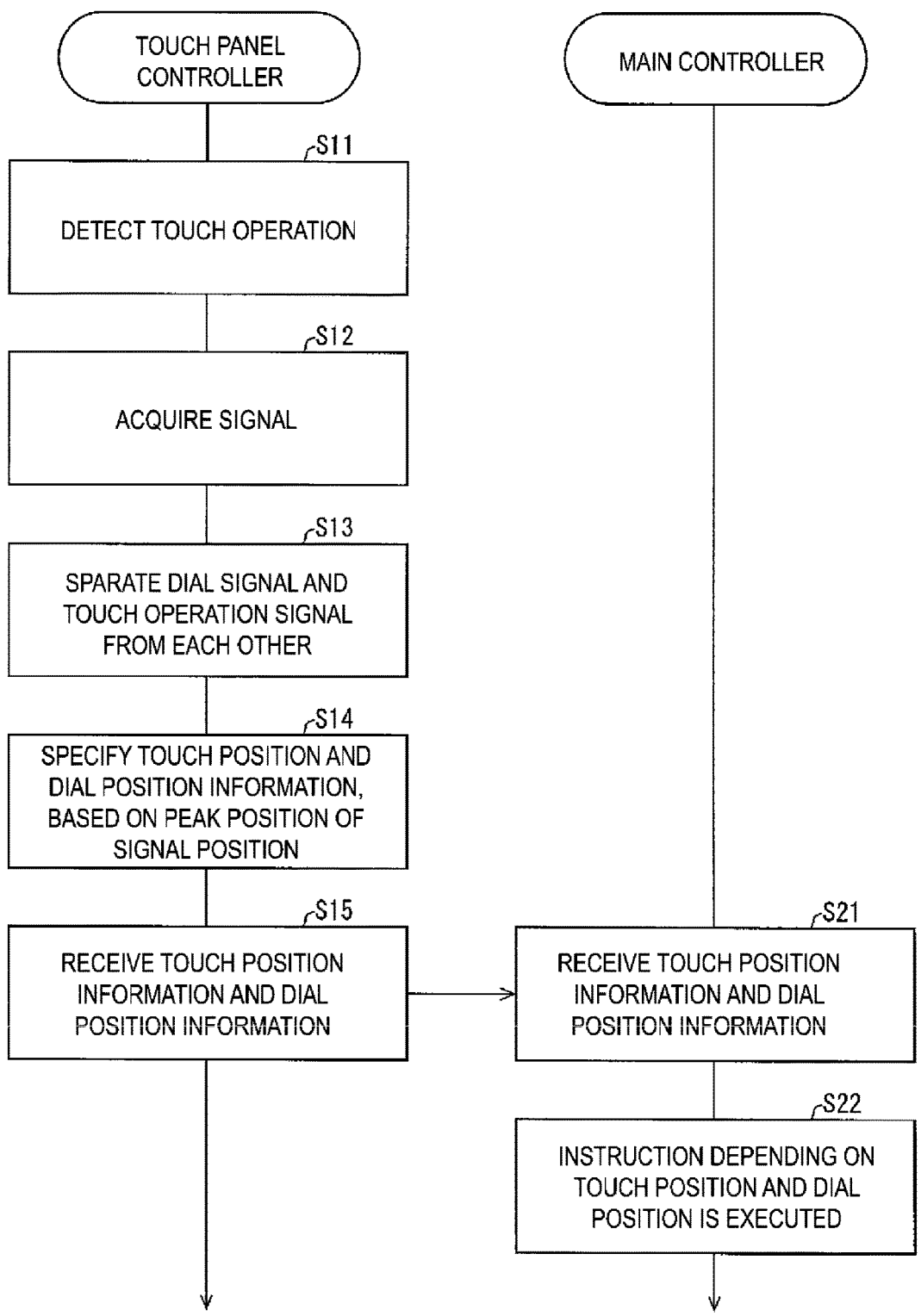
FIG. 5 is a sequence diagram illustrating a flow of an operation of a touch panel controller and a main controller included in the touch device according to the first embodiment.

With reference to FIG. 4 and FIG. 5, description is made on an operation of the touch device 1. FIG. 4 is a block diagram of the touch device 1. FIG. 5 is a sequence illustrating a flow of an operation of each of the touch panel controller 40 and the main controller 50 included in the touch device 1. As illustrated in FIG. 4, the touch panel controller 40 includes a signal detection unit 41, a signal separation unit 42, a touch position specification unit 43, and a dial position specification unit 44.

As illustrated in FIG. 5, the signal detection unit 41 detects a touch operation on the touch panel 10, based on the signals output by the touch panel 10 (S11). The signal separation unit 42 acquires the signals output by the touch panel 10 from the signal detection unit 41 (S12). In this case, the signals output by the touch panel 10 include the dial signal and the background noise described above in addition to the touch operation signal.

First, the signal separation unit 42 eliminates the background noise by subtracting the signals acquired before the dial operation from the signals acquired after the dial operation. Subsequently, the signal separation unit 42 separates the touch operation signal (first signal) and the dial signal (second signal) from each other, based on a difference between the feature of the touch operation signal and the feature of the dial signal (S13). For example, the general feature of the touch operation signal and the general feature of the dial signal may be stored in a storage unit (not illustrated) of the touch device 1 in advance. In this case, the signal separation unit 42 extracts a signal, which has a feature similar to the general feature of the touch operation signal, as the touch operation signal (first signal) from the signals acquired from the signal detection unit 41, by referring to the above-described storage unit. The signal separation unit 42 extracts a signal, which has a feature similar to the general feature of the dial signal, as the dial signal (second signal) from the signals acquired from the signal detection unit 41. Here, for example, a signal shape, a signal distribution, signal time change, and a peak position of a signal value are included in the features of the signals on which the signal separation unit 42 focuses to separate the touch operation signal and the dial signal from each other. The signal separation unit 42 outputs the touch operation signal to the touch position specification unit 43, and outputs the dial signal to the dial position specification unit 44.

The touch position specification unit 43 searches for the peak position of the touch operation signal acquired from the signal separation unit 42, and specifies the determined peak position as a touch position, that is, a position at which the touch operation is performed (S14). Then, the touch position specification unit 43 transmits information on the specified touch position to the main controller 50. The dial position specification unit 44 searches for the peak position of the dial signal separated by the signal separation unit 42, and specifies a dial position, that is, a rotation amount of the dial 20, which is measured from the reference position, based on the determined peak position (S14). The touch position specification unit 43 and the dial position specification unit 44 transmit information on the specified touch position and dial position to the main controller 50 (S15).

The main controller 50 receives the touch position information and the dial position information from the touch panel controller 40 (S21). After that, the main controller 50 executes the instruction depending on the touch position and the dial position, based on the received dial position information and touch position information (S22). For example, the main controller 50 generates the instruction for changing the graphical interface to the display controller 60. In this case, the main controller 50 transmits the generated instruction to the display controller 60. The display controller 60 controls the display 30 in accordance with the instruction received from the main controller 50.

Second Embodiment

Figure 6A:
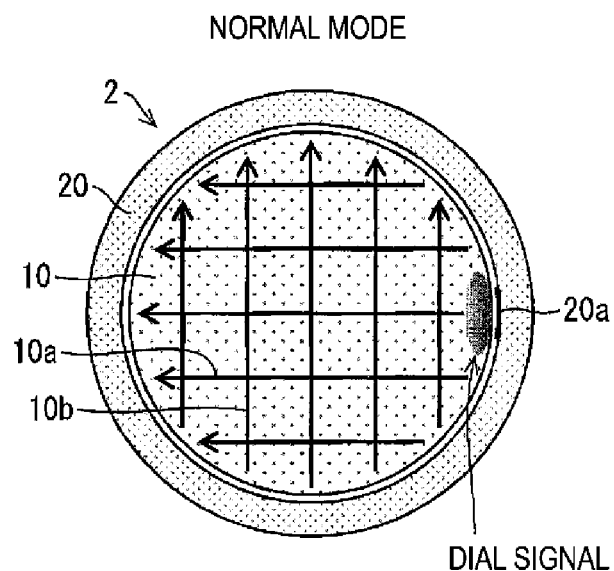
FIG. 6A is a diagram illustrating sensor lines effective in a case where a touch panel in a second embodiment is in a normal mode.
Figure 6B:
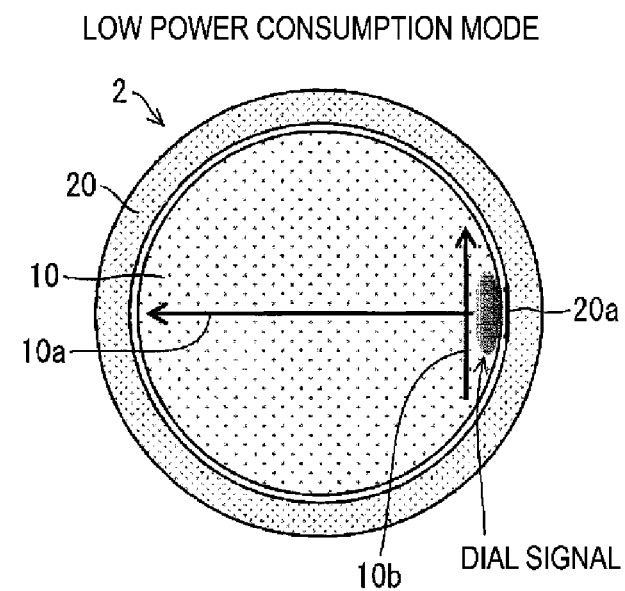
FIG. 6B is a diagram illustrating sensor lines effective in a case where the touch panel is in a low power consumption mode.

With reference to FIGS. 6A and 6B, another embodiment of the disclosure is described as follows. For convenience of description, members having the same function as the members stated in the embodiment above are designated by the same reference signs, and the description thereof is omitted.

A touch device 2 (electronic device) according to a second embodiment has the same constituent elements as the constituent elements of the touch device 1 according to the first embodiment described above (see FIG. 1 and FIG. 4). In the second embodiment, the touch panel controller 40 operates the touch panel 10 in two modes, that is, in a normal mode (first mode) and a low power consumption mode (standby mode) (second mode). More specifically, in a case where the signals output by the touch panel 10 are unchanged for a predetermined time, that is, neither a touch operation nor a dial operation is performed for a predetermined time, the touch panel controller 40 switches the touch panel 10 from the normal mode to the low power consumption mode. Further, in a case where the touch panel 10 is in the low power consumption mode, the touch panel controller 40 switches the touch panel 10 from the low power consumption mode to the normal mode in response to the change of the signals output by the touch panel 10.

FIG. 6A illustrates the sensor lines 10a and 10b that perform scanning in the case where the touch panel 10 is in the normal mode. As illustrated in FIG. 6A, in the case where the touch panel 10 is in the normal mode, the touch panel controller 40 drives all the sensor lines 10a and 10b on the touch panel 10.

FIG. 6B illustrates the sensor lines 10a and 10b that perform scanning in the case where the touch panel 10 is in the low power consumption mode. As illustrated in FIG. 6B, in the case where the touch panel 10 is in the low power consumption mode, the touch panel controller 40 drives only the sensor lines 10a and 10b that detect the dial signal among the sensor lines 10a and 10b on the touch panel 10.

In a case where the touch panel 10 is in the low power consumption mode, performing the dial operation moves the position of the conductive pattern 20a of the dial 20. Thus, the sensor lines 10a and 10b during scanning do not detect the conductive pattern 20a. The signal detection unit 41 detects that the signals output by the touch panel 10 are changed. In this case, the touch panel controller 40 switches the touch panel 10 from the low power consumption mode to the normal mode. Alternatively, the touch panel controller 40 may switch the touch panel 10 from the low power consumption mode to another mode in which a scanning range of the sensor lines 10a and 10b is different from that in the low power consumption mode. In the case where the touch panel 10 is in the normal mode, all the sensor lines 10a and 10b perform scanning, and hence at least one of the sensor lines 10a and 10b is capable of detecting the conductive pattern 20a regardless of the position of the conductive pattern 20a.

According to the configuration of the present embodiment, in the case where the signals output by the touch panel 10 are unchanged, the touch panel controller 40 limits the sensor lines 10a and 10b that perform scanning, and hence power consumption of the touch panel 10 can be significantly reduced.

Third Embodiment

With reference to FIGS. 7A to 7E, another embodiment of the disclosure is described as follows. For convenience of description, members having the same function as the members stated in the embodiment above are designated by the same reference signs, and the description thereof is omitted.

Configuration of Conductive Pattern

FIGS. 7A to 7E illustrate conductive patterns 20a-1 to 20a-5 respectively, which are applicable to each of the touch device 1 according to the first embodiment and the touch device 2 according to the second embodiment. The conductive patterns 20a-1 to 20a-5 are provided on the inner surface of the dial 20. In FIGS. 7A to 7E, the touch panel 10 is positioned on the left side of the conductive patterns 20a-1 to 20a-5. The vertical direction in FIGS. 7A to 7E corresponds to a circumferential direction of the ring-like shape dial 20 illustrated in FIG. 1.

Figures 7A, 7B, 7C, 7D, 7E:
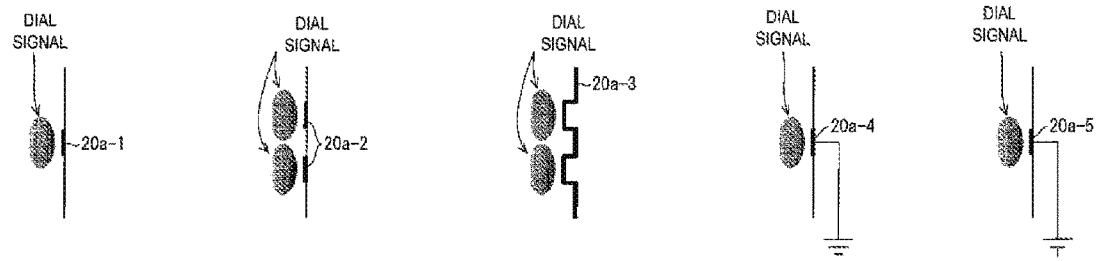

FIG. 7A illustrates a configuration in which the conductive pattern 20a-1 is provided only to one position of the inner surface of the dial 20 similarly to the touch device 1 according to the first embodiment (see FIG. 1). FIG. 7B illustrates a configuration in which the two conductive patterns 20a-2 separate from each other in the circumferential direction of the dial 20 are provided to two position of the inner surface of the dial 20. FIG. 7C illustrates a configuration in which the entire dial 20 is formed of a conductive material and the conductive pattern 20a-3 is formed of a recessed/protruding structure of the dial 20. In FIG. 7D, the conductive pattern 20a-4 is grounded to a casing of each of the touch devices 1 and 2 or a human body. In FIG. 7E, a voltage or a signal is applied to the conductive pattern 20a-5.

According to the configurations of the conductive patterns 20a-1 to 20a-5 illustrated in FIGS. 7A to 7E, the feature of the dial signal on the touch panel 10 (for example, a shape and a distribution) can be clearly different from the feature of the touch operation signal. With this configuration, the signal separation unit 42 of the touch panel controller 40 easily separates the dial signal and the touch operation signal from each other, based on the features of the signals.

Fourth Embodiment

Implementation with Software

Control blocks (in particular, the touch panel controller 40, the main controller 50, and the display controller 60) of the touch devices 1 and 2 may be implemented by a logic circuit (hardware) formed in an integrated circuit (IC chip) or the like, or may be implemented by software using a Central Processing Unit (CPU).

In the case of the latter, each of the touch devices 1 and 2 is provided with a CPU that executes instructions of a program that is software to implement various functions, a Read Only Memory (ROM) or a storage device (these are referred to as a "storage medium") in which the above-described program and various data are stored so as to be readable by a computer (or the CPU), a Random Access Memory (RAM) that temporary stores the above-described program, and the like. Then, by the computer (or the CPU) reading out and executing the above-described program from the above-described storage medium, the object of the disclosure is achieved. As the above-described storage medium, a "non-transitory tangible medium," such as a tape, a disk, a card, a semiconductor memory, or a programmable logic circuit can be used. Furthermore, the above-described program may be supplied to the above-described computer via a chosen transmission medium that can transmit the program (a communication network, broadcast waves, or the like). Note that an aspect of the disclosure can also be realized in the format of data signals that are embedded in carrier waves in which the program is realized by electronic transmission.

Supplement

An electronic device (the touch device 1 or 2) according to a first aspect of the disclosure includes a touch panel (10) of an electrostatic type and a dial (20) having a ring-like shape surrounding a peripheral edge of the touch panel. The dial includes a mark part (the conductive pattern 20a) on an inner surface facing the touch panel or a surface adjacent to the inner surface, the mark part being formed of a conductive material.

According to the above-described configuration, the touch panel generates signals based on electrostatic capacitance between the touch panel and the mark part. In a case where the dial is rotated, the mark part provided to the dial moves accordingly. Along with this configuration, the signals based on the electrostatic capacitance between the touch panel and the mark part also move. Thus, the rotation amount of the dial can be calculated based on the move amount of the signals. Therefore, according to the above-described configuration, a rotation amount detection member implemented by a mechanism is not required.

An electronic device according to a second aspect of the disclosure may be configured such that, in the first aspect described above, the touch panel has a circular shape. According to the above-described configuration, a user can perform a touch operation on a circular-shape touch panel.

An electronic device according to a third aspect of the disclosure may further include, in the first or second aspect, a display (30) arranged on a side opposite to a touch surface of the touch panel. According to the above-described configuration, a graphical interface for a touch operation can be provided to a user with display on the display.

An electronic device according to a fourth aspect of the disclosure may be configured such that, in any of the first to third aspects, the mark part is applied with a voltage. According to the above-described configuration, a distinctive signal based on the electrostatic capacitance between the touch panel and the mark part can be generated on the touch panel. Thus, the distinctive signal is identified easily from the signals generated by the touch panel.

An electronic device according to a fifth aspect of the disclosure may be configured such that, in any of the first to fourth aspects, the mark part is grounded. According to the above-described configuration, even in a case where a finger of a user touches the dial, the feature of the signal based on the electrostatic capacitance between the touch panel and the mark part is not changed. Thus, the distinctive signal based on the electrostatic capacitance between the touch panel and the mark part is identified easily from the signals generated by the touch panel.

An electronic device according to a sixth aspect of the disclosure may further include, in any of the first to fifth aspects, a signal separation unit (42) configured to separate a first signal based on a touch operation and a second signal based on electrostatic capacitance between the touch panel and the mark part from signals output by the touch panel. According to the above-described configuration, the signal based on the touch operation and the signal based on the electrostatic capacitance between the touch panel and the mark part can be separated from each other.

An electronic device according to a seventh aspect of the disclosure may be configured such that, in any of the first to sixths aspects, the mark part is provided to each of two or more positions of the dial. According to the above-described configuration, the distinctive signals based on the electrostatic capacitance between the touch panel and the mark part are generated at the two or more positions on the touch panel. Thus, as compared to the configuration in which the mark part is provided to one position of the dial, the distinctive signal is identified easily from the signals output by the touch panel.

An electronic device according to an eighth aspect of the disclosure may be configured such that, in any of the first to seventh aspects, in a case where signals output by the touch panel are unchanged for a predetermined time, only a sensor line among sensor lines (10a and 10b) on the touch panel performs scanning, the sensor line detecting electrostatic capacitance between the touch panel and the mark part. According to the above-described configuration, power consumption of the touch panel can be reduced remarkably.

An electronic device according to a ninth aspect of the disclosure may be configured such that, in the sixth aspect, a touch position on the touch panel is specified based on the first signal obtained by subtracting, from the signals output by the touch panel, the second signal based on electrostatic capacitance between the touch panel and the mark part. According to the above-described configuration, the touch position can be specified accurately.

An electronic device according to a tenth aspect of the disclosure may be configured such that, in the sixth aspect, a position of the mark part is specified based on the second signal obtained by, from the signals output by the touch panel, the first signal based on the touch operation. According to the above-described configuration, the rotation amount of the dial can be calculated based on the specified position of the mark part.

An electronic device according to an eleventh aspect of the disclosure may be configured such that, in any of the first to tenth aspects, the mark part is formed of a material having conductivity higher than other parts of the dial.

An electronic device according to a twelfth aspect of the disclosure may be configured such that, in any of the first to tenth aspects, the mark part is formed of a recessed and protruding structure formed on the inner surface. According to the above-described configuration, the distinctive signal based on the electrostatic capacitance between the touch panel and the mark part can be generated on the touch panel. With this configuration, the distinctive signal is separated easily from the signals generated by the touch panel.

An electronic device according to a thirteenth aspect of the disclosure may be configured such that, in any of the first to twelfth aspects, a scanning range of the touch panel is changed depending on the position of the mark part. According to the above-described configuration, a user performs the dial operation and changes the position of the mark part to change the scanning range of the touch panel.

An electronic device according to a fourteenth aspect of the disclosure may be configured such that, in any of the first to thirteenth aspects, the electronic device includes a first mode in which an operation based on a touch operation on the touch surface of the touch panel is performed and a second mode in which an operation based on the touch operation is prevented from being performed, and in a case where the mark part moves in the second mode, the electronic device transitions to the first mode. According to the above-described configuration, a user performs the dial operation and changes the position of the mark part to change the modes of the electronic device. For example, the second mode may be a low power consumption mode in which power consumption of the electronic device is reduced as compared to the case where the electronic device is in the first mode.

The electronic device according to each of the aspects of the disclosure may be implemented by a computer. In this case, the scope of the disclosure encompasses a control program of the electronic device, which implements the electronic device with the computer by operating the computer as a software element (for example) included in the electronic device, and a computer-readable recording medium configured to record the control program.

The disclosure is not limited to each of the embodiments described above, and various modifications may be made within the scope of the claims. Embodiments obtained by appropriately combining technical approaches disclosed in each of the different embodiments also fall within the technical scope of the disclosure. Moreover, novel technical features can be formed by combining the technical approaches disclosed in the embodiments.

REFERENCE SIGNS LIST 1, 2 Touch device (electronic device)
10 Touch panel
20 Dial
20a Conductive pattern (mark part)
30 Display
41 Signal detection unit
42 Signal separation unit

The invention claimed is:

1. An electronic device comprising:
A touch panel of an electrostatic type; and
a dial having a ring-like shape surrounding a peripheral edge of the touch panel,
wherein the dial includes a mark part on an inner surface facing the touch panel or a surface adjacent to the inner surface, the mark part being formed of a conductive material,
wherein a scanning range of the touch panel is changed depending on a position of the mark part.

2. The electronic device according to claim 1, wherein the touch panel has a circular shape.

3. The electronic device according to claim 1, further comprising
a display arranged on a side opposite to a touch surface of the touch panel.

4. The electronic device according to claim 1, wherein the mark part is applied with a voltage.

5. The electronic device according to claim 1, wherein the mark part is grounded.

6. The electronic device according to claim 1, further comprising
a signal separation unit configured to separate a first signal based on a touch operation and a second signal based on electrostatic capacitance between the touch panel and the mark part from signals output by the touch panel.

7. The electronic device according to claim 1, wherein the mark part is provided to each of two or more positions of the dial.

8. The electronic device according to claim 1, wherein, in a case where signals output by the touch panel are unchanged for a predetermined time, only a sensor line among sensor lines on the touch panel performs scanning, the sensor line detecting electrostatic capacitance between the touch panel and the mark part.

9. The electronic device according to claim 6, wherein a touch position on the touch panel is specified based on the first signal obtained by subtracting, from the signals output by the touch panel, the second signal based on electrostatic capacitance between the touch panel and the mark part.

10. The electronic device according to claim 6,
wherein a position of the mark part is specified based on the second signal obtained by, from the signals output by the touch panel, the first signal based on the touch operation.

11. The electronic device according to claim 1,
wherein the mark part is formed of a material having conductivity higher than other parts of the dial.

12. The electronic device according to claim 1,
wherein the mark part is formed of a recessed and protruding structure formed on the inner surface.

13. The electronic device according to claim 1,
wherein the electronic device includes a first mode in which an operation based on a touch operation on the touch surface of the touch panel is performed and a second mode in which an operation based on the touch operation is prevented from being performed, and in a case where the mark part moves in the second mode, the electronic device transitions to the first mode.

* * * * *